United States Patent
Nishio et al.

(12) 
(10) Patent No.: US 10,497,498 B2
(45) Date of Patent: Dec. 3, 2019

(54) FERRITE PARTICLES FOR BONDED MAGNETS, RESIN COMPOSITION FOR BONDED MAGNETS, AND MOLDED PRODUCT USING THE SAME

(71) Applicant: TODA KOGYO CORP., Hiroshima-shi, Hiroshima-ken (JP)

(72) Inventors: Yasushi Nishio, Otake (JP); Satoshi Nomura, Otake (JP); Yasuhiko Fujii, Otake (JP); Hiromitsu Sakurai, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 264 days.

(21) Appl. No.: 15/515,003

(22) PCT Filed: Sep. 29, 2015

(86) PCT No.: PCT/JP2015/077461
§ 371 (c)(1),
(2) Date: Mar. 28, 2017

(87) PCT Pub. No.: WO2016/052483
PCT Pub. Date: Apr. 7, 2016

(65) Prior Publication Data
US 2017/0221619 A1   Aug. 3, 2017

(30) Foreign Application Priority Data

Oct. 1, 2014  (JP) .................... 2014-203497

(51) Int. Cl.
*H01F 1/113* (2006.01)
*H01F 1/11* (2006.01)
*C08K 3/01* (2018.01)
*C01G 49/00* (2006.01)

(52) U.S. Cl.
CPC ......... *H01F 1/113* (2013.01); *C01G 49/0018* (2013.01); *C08K 3/01* (2018.01); *H01F 1/11* (2013.01); *C01P 2002/70* (2013.01); *C01P 2004/61* (2013.01); *C01P 2006/42* (2013.01); *C08K 2201/01* (2013.01)

(58) Field of Classification Search
CPC ....... H01F 1/113; H01F 1/11; C01G 49/0018; C01P 2002/70; C01P 2004/61; C01P 2006/42
See application file for complete search history.

(56) References Cited

U.S. PATENT DOCUMENTS

| | | | | |
|---|---|---|---|---|
| 4,200,547 A | * | 4/1980 | Beck ........................ | H01F 1/083 148/101 |
| 4,321,222 A | * | 3/1982 | Moslener ................ | H01F 1/113 264/428 |
| 4,376,726 A | * | 3/1983 | Sakaira ................... | H01F 1/117 252/511 |
| 5,648,039 A | | 7/1997 | Taguchi et al. | |
| 5,945,028 A | | 8/1999 | Taguchi et al. | |
| 6,132,635 A | | 10/2000 | Taguchi et al. | |

FOREIGN PATENT DOCUMENTS

| | | |
|---|---|---|
| EP | 0 905 718 | 3/1999 |
| EP | 1 475 352 | 11/2004 |
| EP | 1 981 044 | 10/2008 |
| EP | 2 003 657 | 12/2008 |
| EP | 2 418 660 | 2/2012 |
| JP | 55-145303 | 11/1980 |
| JP | 55-145304 | * 11/1980 |
| JP | 3-218606 | 9/1991 |
| JP | 6-53064 | 2/1994 |
| JP | 9-106904 | 4/1997 |
| JP | 2000-223307 | 8/2000 |
| JP | 2002-175907 | 6/2002 |
| JP | 2005-268729 | 9/2005 |
| JP | 2007-214510 | 8/2007 |
| JP | 2010-263201 | 11/2010 |

OTHER PUBLICATIONS

Translation for JP 55-145304, Nov. 12, 1980.*
International Preliminary Report on Patentability issued in PCT/JP2015/077461 dated Apr. 4, 2017.
International Search Report for PCT/JP2015/077461, dated Dec. 15, 2015, 4 pages.
Extended European Search Report issued in Appln. No. 15847303.3 dated Mar. 28, 2018.

* cited by examiner

*Primary Examiner* — C Melissa Koslow
(74) *Attorney, Agent, or Firm* — Nixon & Vanderhye P.C.

(57) ABSTRACT

The object of the present invention relates to ferrite particles for bonded magnets and a resin composition for bonded magnets which is capable of obtaining a bonded magnet molded product having a good magnetic force and a magnetic waveform as well as high iHc and Hk by injection molding. The present invention aims at providing a bonded magnet molded product using the ferrite particles and the resin composition. The aforementioned object of the present invention can be achieved by ferrite particles for bonded magnets which have a crystal distortion of not more than 0.14 as measured by XRD, and an average particle diameter of not less than 1.30 μm as measured by Fisher method; a resin composition for bonded magnets; and a molded product obtained by injection-molding the resin composition.

5 Claims, No Drawings

FERRITE PARTICLES FOR BONDED MAGNETS, RESIN COMPOSITION FOR BONDED MAGNETS, AND MOLDED PRODUCT USING THE SAME

This application is the U.S. national phase of International Application No. PCT/JP2015/077461 filed 29 Sep. 2015 which designated the U.S. and claims priority to JP Patent Application No. 2014-203497 filed 1 Oct. 2014, the entire contents of each of which are hereby incorporated by reference.

TECHNICAL FIELD

The present invention relates to ferrite particles for bonded magnets and a resin composition for bonded magnets which are capable of producing a bonded magnet molded product having a good magnetic force and a good magnetic waveform by injection molding, as well as a bonded magnet molded product using the ferrite particles and the resin composition.

BACKGROUND ART

As well known in the art, bonded magnets have many advantages such as light weight, good dimensional accuracy, and facilitated mass-production of molded products having even a complicated shape as compared to sintered magnets, and, therefore, have been extensively used in various applications such as toys, office equipments, audio equipments and motors.

As the magnetic particles usable in the bonded magnets, there are known rare earth element magnet particles such as typically Nd—Fe—B-based alloy particles, or ferrite particles. The rare earth element magnet particles have high magnetic properties, but are expensive, resulting in limited applications thereof. On the other hand, the ferrite particles are somewhat deteriorated in magnetic properties as compared to the rare earth element magnet particles, but are inexpensive and chemically stable and, therefore, have been used in more extensive applications.

The bonded magnets have been in general produced by kneading a rubber or a plastic material with magnetic particles and then molding the resulting kneaded material in a magnetic field or by using a mechanical means.

In recent years, with the enhancement in performance of various materials or equipments including an improved reliability, there is also an increasing demand for a high performance of bonded magnets used therein including enhancement in strength and magnetic properties of the bonded magnets.

More specifically, the bonded magnet molded products obtained by injection molding, etc., are also required to exhibit a magnetic potential inherent to magnetoplumbite-type ferrite particles packed therein to a maximum extent. That is, since the ferrite particles have such a feature that they are highly oriented against an external magnetic field, the bonded magnet molded products are capable of realizing a high magnetic force and a complicated multipolar waveform.

For example, in the applications of motors, rotors and sensors, the bonded magnet tends to be frequently subjected to multipolar magnetization when machined into various sizes and complicated shapes by injection molding. For this reason, in order to satisfy the multipolar magnetic waveform and magnetic force as desired, it has been strongly required that the ferrite particles exhibit a high orientation during flowing of the resin composition.

In the motors and rotors, when feeding a large amount of electric current through an exciting coil, a large diamagnetic field is applied to a magnet, so that a residual magnetic flux density Br of the magnet is reduced by from several % to about 10-odd % owing to demagnetization thereof. Therefore, in the bonded magnets used in the motors and rotors, it is necessary to take the demagnetization owing to the diamagnetic field into consideration, and the bonded magnets are required to have a high coercive force as well as a reduced demagnetizing factor. In this case, the diamagnetic field in which the residual magnetic flux density Br of the bonded magnets is reduced up to 0 mT owing to demagnetization thereof is represented by a coercive force iHc, whereas the diamagnetic field in which the residual magnetic flux density Br of the bonded magnets is reduced by 10% owing to demagnetization thereof is represented by Hk. As Hk of the bonded magnets is increased, the degree of demagnetization thereof when used in the motors and rotors becomes smaller. Therefore, it is necessary to enhance Hk as an index of demagnetization resistance of the bonded magnets in the motors and rotors. That is, it is necessary to improve squareness of of the bonded magnets.

For this reason, the ferrite particles used in the bonded magnets as well as the resin compositions for the bonded magnets which comprise the ferrite particles and an organic binder are also required to satisfy the above requirements.

Conventionally, ferrite particles for bonded magnets and resin compositions for bonded magnets which comprise the ferrite particles and the organic binder have been improved variously. For example, there are known the method of producing ferrite particles by using an alkali metal compound or an alkali earth metal compound as a flux (Patent Literature 1); the method of using anisotropic ferrite particles and an inorganic substance pulverized product (Patent Literature 2); the method of producing a bonded magnet using ferrite magnetic particles comprising an alkali earth metal as a constituting component and having an average particle diameter of not less than 1.50 μm and a melt flow rate of not less than 91 g/10 min (Patent Literature 3); the method of controlling properties of compacted calcined particles obtained by producing particles having an average particle diameter of not more than 2.5 μm and a specific surface area of not less than 1.25 m$^2$/g and then subjecting the resulting particles to annealing and further to compaction, so as to satisfy the conditions of Ra<2.5 μm and Ra−Da<0.5 μm wherein Ra (μm) represents an average particle diameter of the particles as measured by a dry air dispersion laser diffraction method, and Da (μm) represents a specific surface area diameter of the particles as measured by an air permeability method (Patent Literature 4); the method of calcining a ferrite at a temperature of 1050 to 1300° C. under a saturated vapor pressure of a chloride thereof, mixing the calcined ferrite with fine ferrite particles having a small particle diameter, and then annealing the resulting mixture at a temperature of 800 to 1100° C. to obtain a ferrite having a large particle diameter, a clear crystal structure, a coercive force that is hardly reduced even when pressed, and an energy product of not less than 2.0 MGOe (Patent Literature 5); or the like.

CITATION LIST

Patent Literature

Patent Literature 1: Japanese Patent Application Laid-Open (KOKAI) No. 55-145303

Patent Literature 2: Japanese Patent Application Laid-Open (KOKAI) No. 3-218606

Patent Literature 3: Japanese Patent Application Laid-Open (KOKAI) No. 2005-268729

Patent Literature 4: Japanese Patent Application Laid-Open (KOKAI) No. 2007-214510

Patent Literature 5: Japanese Patent Application Laid-Open (KOKAI) No. 2010-263201

SUMMARY OF INVENTION

Technical Problem

At the present time, the ferrite particles for bonded magnets and/or the resin compositions for bonded magnets which are capable of satisfying the above requirements have been strongly required. However, the ferrite particles and/or resin compositions capable of satisfying the above requirements to a sufficient extent have not been obtained yet.

That is, the bonded magnet molded products produced by using the ferrite particles or resin compositions for bonded magnets as described in the above Patent Literatures 1 to 5 have failed to provide those products which are excellent in all of orientation property, demagnetization resistance and mechanical strength.

In consequence, an object or technical task of the present invention is to provide ferrite particles for bonded magnets and a resin composition for bonded magnets which are capable of producing a bonded magnet exhibiting a high orientation property, a high demagnetization resistance and an excellent mechanical strength.

Solution to Problem

The above object or technical task of the present invention can be achieved by the following aspects of the present invention.

That is, according to the present invention, there are provided ferrite particles for bonded magnets which have a crystal distortion of not more than 0.14 as measured by XRD, and an average particle diameter of not less than 1.30 μm as measured by Fisher method (Invention 1).

Also, according to the present invention, there are provided the ferrite particles for bonded magnets as described in the above Invention 1, wherein the ferrite particles are magnetoplumbite-type ferrite particles (Invention 2).

In addition, according to the present invention, there is provided a resin composition for bonded magnets, comprising 83 to 93% by weight of the ferrite particles for bonded magnets as described in the above Invention 1 or 2, and 7 to 17% by weight of an organic binder component (Invention 3).

Further, according to the present invention, there is provided a molded product comprising the resin composition for bonded magnets as described in the above Invention 3 (Invention 4).

Also, according to the present invention, there is provided the molded product as described in the above Invention 4, wherein the molded product is an injection-molded product (Invention 5).

Advantageous Effects of Invention

The ferrite particles for bonded magnets according to the present invention have such a powder characteristic that a crystal distortion thereof is controlled to not more than 0.14 as measured by XRD, and an average particle diameter thereof is controlled to not less than 1.30 μm as measured by Fisher method. For this reason, when injection-molding a kneaded compound comprising the aforementioned particles, the magnetic particles can exhibit an excellent orientation property and an excellent demagnetization resistance, and are therefore suitable as magnetic particles for bonded magnets.

In the present invention, the "higher (or excellent) orientation property" as used herein means that in the magnetic particles having the same ferrite content, not only the saturation magnetic flux density (4·Is) but also the residual magnetic flux density (Br) of the magnetic particles are high, but does not mean that only the orientation ratio (Br/4·Is) of the magnetic particles is high. Even though the orientation ratio of the magnetic particles is similar, if the saturation magnetic flux density (4·Is) itself of the magnetic particles is low, the residual magnetic flux density (Br) of the magnetic particles is also low, so that the resulting magnetic particles may fail to have a high orientation property.

In the present invention, the "excellent demagnetization resistance" as used herein means that in the resin compositions for bonded magnets having the same content of ferrite particles, not only an iHc value and but also an Hk value of the resin compositions are high, but does not mean that only the iHc value of the resin compositions is high. The iHc value indicates the diamagnetic field to reduce the residual magnetic flux density Br of the resin compositions to 0 mT owing to demagnetization thereof. On the other hand, the Hk value indicates the diamagnetic field to reduce the residual magnetic flux density Br of the resin compositions by 10% owing to demagnetization thereof, that is, the diamagnetic field having a squareness. Even though the resin compositions have the same iHc value, the resin composition having a higher Hk value is capable of more effectively suppressing demagnetization in the motors and rotors.

The resin composition for bonded magnets according to the present invention is capable of providing a molded product that is excellent in mechanical strength and magnetic properties and therefore can be suitably used as a resin composition for bonded magnets.

DESCRIPTION OF EMBODIMENTS

The present invention is described in detail below.

First, the ferrite particles for bonded magnets according to the present invention (hereinafter referred to merely as "ferrite particles") are explained.

The composition of the ferrite particles according to the present invention is not particularly limited as long as they are in the form of a magnetoplumbite-type ferrite, and may be either Sr-based ferrite particles or Ba-based ferrite particles. In addition, the ferrite particles may also comprise different kinds of elements such as La, Nd, Pr, Co and Zn.

The particle shape of the ferrite particles according to the present invention is a plate shape, and preferably a generally hexagonal plate shape.

The crystal distortion (lattice distortion) of the ferrite particles according to the present invention is not more than 0.14. When the crystal distortion of the ferrite particles is more than 0.14, the crystallinity of the ferrite particles is low, so that magnetic properties, iHc and Hk of a molded product obtained by injection-molding a resin composition using the ferrite particles tend to be undesirably deteriorated. The crystal distortion of the ferrite particles according to the present invention is more preferably not more than 0.13, and even more preferably not more than 0.12. The theoretical lower limit of the crystal distortion of the ferrite particles is 0. The crystal distortion of 0 is the value obtained upon measuring the ferrite particles in a non-oriented state. Further, the crystallite size of the ferrite particles according to the present invention is preferably not less than 130 nm, and more preferably 150 to 300 nm.

The average particle diameter of the ferrite particles according to the present invention as measured by Fisher method is not less than 1.30 μm. When the average particle diameter of the ferrite particles is less than 1.30 μm, the resin composition comprising the ferrite particles tends to fail to ensure good viscosity suitable for the orientation (tends to be deteriorated in flowability), so that it may be difficult to produce a bonded magnet having high magnetic properties. The average particle diameter of the ferrite particles is preferably not less than 1.40 μm and more preferably not less than 1.50 μm. The upper limit of the average particle diameter of the ferrite particles is about 4.00 μm. Meanwhile, as described above, the particle shape of the ferrite particles according to the present invention is not a spherical shape but a plate shape, and the average particle diameter thereof indicates a numeral value of the particle diameter as determined by Fisher method.

The BET specific surface area value of the ferrite particles according to the present invention is preferably 1.5 to 2.5 $m^2/g$.

The average thickness of the ferrite particles according to the present invention as measured by observation using a scanning electron microscope is preferably 0.2 to 1.0 μm. When the average thickness of the ferrite particles is out of the above-specified range, the resulting ferrite particles tend to be hardly packed with a high density when being formed into a bonded magnet, so that it may be difficult to produce a bonded magnet having high magnetic properties. The average thickness of the ferrite particles according to the present invention is more preferably 0.3 to 1.0 μm and even more preferably 0.4 to 0.7 μm.

The plate ratio (average plate diameter/thickness) of the ferrite particles according to the present invention is preferably 2.0 to 7.0 and more preferably 2.0 to 5.0 as measured by observation using a scanning electron microscope. When the plate ratio of the ferrite particles is controlled to the above-specified range, it is possible to allow the resin composition comprising the ferrite particles to flow in the direction parallel with the oriented surface of the particles.

The saturation magnetization value σs of the ferrite particles according to the present invention is preferably 65.0 to 73.0 $Am^2/kg$ (65.0 to 73.0 emu/g), and the coercive force Hc of the ferrite particles is preferably 206.9 to 279 kA/m (2600 to 3500 Oe). In addition, Br of the ferrite particles is preferably 160 to 200 mT (1600 to 2000 G).

Next, the process for producing the ferrite particles according to the present invention is described.

The ferrite particles according to the present invention may be produced by blending and mixing raw material particles at a predetermined mixing ratio; molding the resulting mixture using a roller compactor; calcining the resulting molded product at a temperature of 900 to 1250° C. in atmospheric air and then subjecting the calcined particles to pulverization using a vibration mill and washing with water; and then subjecting the resulting particles to annealing heat treatment at a temperature of 700 to 1100° C. in atmospheric air.

The raw material particles may be appropriately selected from particles of oxides, hydroxides, carbonates, nitrates, sulfates, chlorides, etc., of various metals which are capable of forming a magnetoplumbite-type ferrite. Meanwhile, from the standpoint of improving a reactivity of the raw material particles upon calcining, the particle diameter of the raw material particles is preferably not more than 2.0 μm.

In addition, in the present invention, the mixed raw material particles are preferably calcined by adding a flux thereto. As the flux, there may be used various fluxes. Examples of the flux include $SrCl_2 \cdot 6H_2O$, $CaCl_2 \cdot 2H_2O$, $MgCl_2$, KCl, NaCl, $BaCl_2 \cdot 2H_2O$ and $Na_2B_4O_7$, etc. The amount of the respective fluxes added is preferably 0.1 to 10 parts by weight and more preferably 0.1 to 8.0 parts by weight on the basis of 100 parts by weight of the mixed raw material particles.

Also, in the present invention, $Bi_2O_3$ may be added to and mixed in the mixed raw material particles or the particles obtained by calcining and then pulverizing the raw material particles.

Meanwhile, in the present invention, from the standpoint of well controlling the particle size distribution, larger particles and smaller particles may be used in the form of a mixture thereof.

The molding before the calcination is preferably conducted using a roller compactor because it is important to compress and granulate the raw material mixture. The raw material mixture is forced between two rolls through a screw and compressed and granulated therebetween. The compression pressure of the pressing rolls is preferably not less than 70 $kg/cm^2$, and more preferably not less than 80 $kg/cm^2$. As the distance between $Fe_2O_3$ and $SrCO_3$ as the raw materials becomes smaller, the ferritization reaction that is a solid state reaction tends to have a higher reactivity, and the diffraction peak intensity in XRD tends to be increased. Also, even under the same compression pressure condition, as the amount of the flux added which acts as the binder becomes larger, the bulk density of the granulated product is increased, which is desirable for the ferritization reaction. On the other hand, when the amount of the flux added is excessively large or when the combination of the fluxes and ratios thereof are inadequate, the crystallinity of the ferrite particles tends to be deteriorated. Meanwhile, when compressed and granulated, a very small amount of water may be added as the binder component.

In addition, in the present invention, after the calcination is conducted in a temperature range of 900 to 1250° C., the resulting calcined product is pulverized and subjected to annealing heat treatment in a temperature range of 700 to 1100° C. In this case, the pulverization is preferably conducted using a vibration mill. By conducting the pulverization using the vibration mill, it is possible to obtain the ferrite particles having desired properties as aimed by the present invention.

In the ferrite particles according to the present invention, in order to control a crystal distortion of the ferrite particles to not more than 1.4 as measured by XRD, as described above, it is necessary to optimize the conditions of compressing and granulating the raw material mixture upon molding before the calcination, the kind and amount of flux added and the conditions of pulverization after the calcination, in combination thereof. These requirements are appropriately combined to thereby adjust the crystal distortion of the ferrite particles within the range of the present invention.

Next, the resin composition for bonded magnets using the ferrite particles according to the present invention is described.

The resin composition for bonded magnets according to the present invention can be produced by mixing and kneading the ferrite particles with an organic binder component and a silane coupling agent component such that the amount of the ferrite particles present in the resin composition for bonded magnets is 83 to 93 parts by weight, and the total amount of the organic binder component and the silane coupling agent component present in the resin composition for bonded magnets is 17 to 7 parts by weight. When the amount of the ferrite particles present in the resin composition is less than the above-specified range, it is not possible to obtain a bonded magnet having desired magnetic properties cannot be obtained. When the amount of the ferrite particles present in the resin composition is more than the above-specified range, the resulting resin composition tends to be deteriorated in flowability, so that it may be difficult to mold the resin composition for forming a bonded magnet, and furthermore it is not possible to attain a good dispersion condition of the ferrite particles in the molded product due to deterioration in moldability of the resin composition. As a result, the resulting bonded magnet tends to be deteriorated in magnetic properties.

The organic binder used in the present invention is not particularly limited as long as it may be usually used in conventional bonded magnets. The organic binder usable in the present invention may be appropriately selected from rubbers, vinyl chloride resins, ethylene-vinyl acetate copolymer resins, ethylene-ethyl acrylate copolymer resins, PPS resins, polyamide (nylon) resins, polyamide elastomers and polymeric fatty acid-based polyamides, depending upon the applications thereof. Among these organic binders, in the case where it is intended to preferentially achieve good strength and rigidity of the resulting molded product, the polyamide resins can be more suitably used. In addition, if required, a known mold release agent such as fatty acid metal salts or fatty acid amides may be added to the organic binder.

In the present invention, as the silane coupling agent, there may be used those silane coupling agents comprising, as functional groups, any one of a vinyl group, an epoxy group, an amino group, a methacryl group and a mercapto group, as well as any one of a methoxy group and an ethoxy group. Among these silane coupling agents, preferred are those silane coupling agents comprising an amino group and a methoxy group or those silane coupling agents comprising an amino group and an ethoxy group.

Next, the process for producing the resin composition for bonded magnets by using the ferrite particles, the resin binder and the silane coupling agent according to the present invention is described.

The resin composition for bonded magnets according to the present invention may be produced by any suitable conventionally known processes used for producing the conventional resin compositions for bonded magnets. For example, the silane coupling agent, etc., may be added to and uniformly mixed with the ferrite particles according to the present invention, and then the organic binder component may be further uniformly mixed with the resulting mixture. Thereafter, the thus obtained mixture is melted and kneaded using a kneading extruder, etc., and the resulting kneaded material is pulverized or cut into granules or pellets.

The amount of the silane coupling agent added is 0.15 to 3.5 parts by weight and preferably 0.2 to 3.0 parts by weight on the basis of 100 parts by weight of the ferrite particles according to the present invention.

The crystal distortion of the ferrite particles according to the present invention is preferably not more than 0.14, and more preferably not more than 0.13 when held in an oriented state after kneaded with the resin. Further, the crystallite size of the ferrite particles according to the present invention is preferably not less than 500 nm, and more preferably 700 to 2000 nm when held in an oriented state. Meanwhile, the crystal distortion and the crystallite size of the ferrite particles are different between a non-oriented state of the ferrite particles only and an oriented state of the ferrite particles after kneaded with the resin. The ferrite particles are particles having an orientation property, and therefore, XRD measurement in the non-oriented state lacks reproducibility. In consequence, in the present invention, the measurement of the ferrite particles is conducted in a completely oriented state in EVA, so that only an XRD peak in the oriented surface can be detected with good reproducibility.

Next, the method of measuring the crystal distortion and the crystallite size of the ferrite particles by XRD according to the present invention is described.

After mixing 162.5 g (100 parts by weight) of the ferrite particles, 17.7 g (10.9 parts by weight) of EVA (ethylene-vinyl acetate copolymer resin) and 0.35 g (0.22 part by weight) of zinc stearate (produced by Sigma-Aldrich Co., LLC.) with each other, the resulting mixture was kneaded at 80° C. for 20 min using a plastomill "ME-5HP Model" (manufactured by Toyo Seiki Seisakusho Ltd.). After completion of the kneading, the resulting kneaded material was taken out of the plastomill and molded into a sheet shape having a thickness of 1.5 to 2.0 mm by a twin roll "No. 88-43" (manufactured by Nishimura Koki Co., Ltd.) heated to a temperature of 60 to 63° C. The resulting sheet-like mixture was punched into a cylinder shape, and two sheets of the cylindrical material were placed in a metal mold in which the material was melted at 155° C., and a magnetic field of 9 kOe was applied thereto 7 times in each of opposite directions. The molten material was allowed to stand while applying the magnetic field thereto until it was cooled to room temperature. The resulting test core was demagnetized using a demagnetizer and placed such that X-ray was incident on the oriented surface thereof to measure a crystal distortion and a crystallite size of the ferrite particles therein by XRD.

Next, the method of measuring magnetic field orientation magnetic properties in EVA kneading evaluation according to the present invention is described.

After mixing 162.5 g (100 parts by weight) of the ferrite particles, 17.7 g (10.9 parts by weight) of EVA (ethylene-vinyl acetate copolymer resin) and 0.35 g (0.22 part by weight) of zinc stearate (produced by Sigma-Aldrich Co., LLC.) with each other, the resulting mixture was kneaded at 80° C. for 20 min using a plastomill "ME-5HP Model" (manufactured by Toyo Seiki Seisakusho Ltd.). After completion of the kneading, the resulting kneaded material was taken out of the plastomill and molded into a sheet shape having a thickness of 1.5 to 2.0 mm by a twin roll "No. 88-43" (manufactured by Nishimura Koki Co., Ltd.) heated to a temperature of 60 to 63° C. The resulting sheet-like mixture was punched into a cylinder shape, and six sheets of the cylindrical material were placed in a metal mold in which the material was melted at 155° C., and a magnetic field of 9 kOe was applied thereto 7 times in each of opposite directions. The molten material was allowed to stand while applying the magnetic field thereto until it was cooled to room temperature. The resulting test core was subjected to measurement of magnetic properties thereof using a BH tracer.

Next, the test piece molded product for evaluation of magnetic properties upon injection according to the present invention is described.

The test piece molded product may be produced by the following method. That is, the ferrite magnetic particles for bonded magnets, the organic binder component, etc., are previously uniformly mixed with each other, and/or melted and kneaded after being mixed together, and then pulverized or cut into pellets to prepare a resin composition for bonded magnets. The resulting resin composition is treated by the method as described below, thereby obtaining the test core having a diameter of 25 mmϕ and a thickness of 10.5 mm.

When measuring the magnetic properties by the methods described above and in the below-mentioned Examples, the residual magnetic flux density Br of the resin composition for bonded magnets and the molded body thereof according to the present invention is preferably not less than 230 mT (2300 G), and more preferably not less than 235 mT (2350 G); the coercive force iHc of the resin composition for bonded magnets and the molded body thereof according to the present invention is preferably 206.9 to 278.5 kA/m (2600 to 3500 Oe), and more preferably 214.9 to 258.6 kA/m (2700 to 3250 Oe); the maximum energy product $BH_{max}$ of the resin composition for bonded magnets and the molded body thereof according to the present invention is preferably not less than 10.3 kJ/m$^3$ (1.30 MGOe), and more preferably not less than 10.7 kJ/m$^3$ (1.35 MGOe); the saturation magnetic flux density 4·Is of the resin composition for bonded magnets and the molded body thereof according to the present invention is preferably not less than 230 mT (2300 G), and more preferably not less than 240 mT (2400 G); the Br/4·Is value of the resin composition for bonded magnets and the molded body thereof according to the present invention is preferably not less than 0.95, and more preferably not less than 0.96; the Hk value of the resin composition for bonded magnets and the molded body thereof according to the present invention is preferably not less than 198.9 kA/m (2500 Oe), and more preferably not less than 202.9 kA/m (2550 Oe); and the bHc value of the resin composition for bonded magnets and the molded body thereof according to the present invention is preferably not less than 198.9 kA/m (2500 Oe), and more preferably not less than 202.9 kA/m (2550 Oe).

The tensile strength of the molded product comprising the resin composition for bonded magnets according to the present invention is preferably not less than 60 (MPa), the flexural strength of the molded product is preferably not less than 110 (MPa), and the Izod impact strength of the molded product is preferably not less than 16 KJ/m$^2$, or the molded product is not broken (NB), as measured by the method as described in Examples below.

<Function>

The reason why by controlling the crystal distortion of the ferrite particles to not more than 0.14 as measured in XRD measurement thereof, and controlling the average particle diameter of the ferrite particles to not less than 1.30 μm as measured by Fisher method, not only the ferrite particles according to the present invention can be improved in coercive force and the resin composition comprising the ferrite particles according to the present invention can ensure a good viscosity suitable for orientation of the ferrite particles, but also the molded product comprising the ferrite particles and/or the resin composition for bonded magnets according to the present invention can exhibit an excellent orientation property and Hk, is considered by the present inventors as follows, although it is not clearly determined yet.

That is, it is considered that by controlling the crystal distortion of the ferrite particles according to the present invention to not more than 0.14 as measured in XRD evaluation thereof and controlling the average particle diameter of the ferrite particles to not less than 1.30 μm as measured by Fisher method, the ferrite particles have an increased crystallinity and a high coercive force. In addition, the ferrite particles has such a particle shape that when injecting the resin composition into a mold cavity in a magnetic field, the ferrite particles therein are flowable in the direction parallel with the oriented surface thereof, and the ferrite particles also exhibit a good crystallinity so that the orientation of the ferrite particles against an external magnetic field can be facilitated.

It is considered that since the resin composition for bonded magnets according to the present invention comprises 83 to 93% by weight of the above ferrite particles for bonded magnets and 7 to 17% by weight of the organic binder component, the ferrite particles and the organic binder can be held in the resin composition under a uniform and ideal dispersion condition.

EXAMPLES

The typical examples of the present invention are described below.

The average particle diameter of the ferrite particles according to the present invention was measured using "Sub-Sieve Sizer Model 95" manufactured by Fisher Scientific K.K.

The crystal distortion and the crystallite size (non-oriented state) of the ferrite particles according to the present invention was measured by XRD method in which the ferrite particles were charged into a test piece holder for XRD measurement and subjected to the XRD measurement using TOPAS software produced by Bruker AXS K.K.

The BET specific surface area of the ferrite particles according to the present invention was measured using a fully-automatic specific surface area analyzer "Macsorb model-1201" manufactured by Mountech Co., Ltd.

The compacted (compressed) density of the ferrite particles according to the present invention was determined as a density of the particles which was measured by compacting the particles under a pressure of 1 t/cm$^2$.

The residual magnetic flux density Br and the coercive force iHc of the ferrite particles were determined as follows. That is, the particles were compacted by applying a pressure of 1 t/cm$^2$ thereto to obtain a compacted core, and then the magnetic properties of the thus obtained compacted core were measured in a magnetic field of 14 kOe using a "D.C. magnetization characteristic automatic recorder 3257" manufactured by Yokogawa Hokushin Denki Co., Ltd.

The melt mass flow rate (MFR) of the resin composition for bonded magnets was determined by melting the resin composition at 270° C. and measuring the MFR of the molten resin composition under a load of 10 kg, according to JIS K7210.

The molding density of the resin composition for bonded magnets was determined as follows. That is, the resin composition for bonded magnets was melted in a cavity of a metal mold having a diameter of 25 mmϕ and a height of 10.5 mm to obtain a molded core, and the density of the thus obtained molded core was measured using an electronic specific gravity meter "EW-120SG" manufactured by Yasuda Seiki Seisakusho Co., Ltd.

The test core used for measuring magnetic properties was obtained as follows. That is, using an injection molding machine "J20MII Model" manufactured by Nippon Seikosho Co., Ltd., pellets of the resin composition were melted at a cylinder temperature of 260° C., and the obtained molten resin was injected at a metal mold temperature of 80° C. while applying a magnetic field of 4.0 kOe thereto to thereby obtain the test core having a diameter of 25.0 mm and a thickness of 10.5 mm. The injection pressures upon injection-molding the test core were recorded to evaluate the injection moldability of the resin composition. Various magnetic properties (Hk, residual magnetic flux density Br, coercive force iHc, coercive force bHc, maximum energy product $BH_{max}$ and saturation magnetic flux density 4·Is) of the obtained test core were measured using a DC magnetizing characteristics analyzer "BH-5501" manufactured by Electronic Magnetic Industry Co., Ltd.

The test piece used for measuring the strength was obtained as follows. That is, using an injection molding machine "J20MII Model" manufactured by Nippon Seikosho Co., Ltd., a test piece molded product having an overall length of 175 mm, an overall width of 12.5 mm and a thickness of 3.2 mm was obtained. The injection pressures upon injection-molding the test piece were recorded to evaluate the injection moldability of the resin composition.

The tensile strength was measured according to ASTM D638 Standard. Specifically, the test piece was prepared using an injection molding machine "J20MII Model" manufactured by Nippon Seikosho Co., Ltd., and then the tensile strength of the test piece was measured using a computer-aided measurement control system precision universal tester "AG-1" manufactured by Shimadzu Corp.

The flexural strength was measured according to ASTM D790 Standard. Specifically, the test piece was prepared using an injection molding machine "J20MII Model" manufactured by Nippon Seikosho Co., Ltd., and then the flexural strength of the test piece was measured using a computer-aided measurement control system precision universal tester "AG-1" manufactured by Shimadzu Corp.

The Izod impact strength was measured according to ASTM D256 Standard. Specifically, the test piece was prepared using an injection molding machine "J20MII Model" manufactured by Nippon Seikosho Co., Ltd., and then the Izod impact strength of the test piece was measured using an Izod impact tester "No. 158" manufactured by Yasuda Seiki Seisakusho Co., Ltd.

Example 1

<Production of Ferrite Particles>

One hundred thousand grams of powdery $\alpha$-$Fe_2O_3$ and 15900 g of $SrCO_3$ were weighed (molar ratio of Fe and Sr: 2Fe:Sr=5.95:1), mixed with each other in a wet attritor for 30 min, and then subjected to filtration and drying. An aqueous solution of $SrCl_2$ and an aqueous solution of $Na_2B_4O_3$ were respectively added and intimately mixed in the thus obtained raw material mixed particles, and the resulting mixture was then compressed and granulated under 90 Kg/$cm^2$ using a roller compactor. At this time, the amounts of $SrCl_2$ and $Na_2B_4O_7$ added were 2.5% by weight and 0.25% by weight, respectively, based on the weight of the above raw material mixed particles. The resulting granulated product was calcined in atmospheric air at 1150° C. for 2 hr. The resulting calcined product was coarsely crushed, and then pulverized by a wet attritor for 30 min, followed by subjecting the resulting particles to washing with water, filtration and drying. Thereafter, a mixed solution of isopropyl alcohol and triethanol amine was added to the resulting particles, and further the particles were pulverized using a dry vibration mil for 30 min. At this time, the mixed solution was added in such an amount that the amounts of isopropyl alcohol and triethanol amine added were 0.2% by weight and 0.1% by weight, respectively, based on the above wet-pulverized dried product. Then, the resulting pulverized product was subjected to heat treatment in atmospheric air at 970° C. for 1.5 hr.

The production conditions used above are shown in Table 1, and various properties of the obtained ferrite particles are shown in Table 2.

Example 2

The same procedure as in Example 1 was conducted except that the composition, the amounts of the respective raw materials added and the calcination/heat treatment temperatures, etc., were changed variously, thereby producing ferrite particles.

The production conditions used above are shown in Table 1, and various properties of the obtained ferrite particles are shown in Table 2.

Comparative Examples 1 and 2

The composition, kinds and amounts of additives added, compression pressure upon granulation, etc., were changed variously, and a dry attritor was used in place of the dry vibration mill, thereby producing ferrite particles of Comparative Examples 1 and 2. The production conditions used above are shown in Table 1, and various properties of the obtained ferrite particles for bonded magnets are shown in Table 2.

Meanwhile, in Table 2, for the sake of easy comparison, there are also shown orientation conditions with respect to the crystal distortion and the crystallite size (measurement results of the resin compositions for bonded magnets in Examples 3 to 5 and Comparative Examples 3 to 6 as described below).

Example 3

<Production of Resin Composition for Bonded Magnets>

The ferrite particles obtained in Example 1 were weighed in an amount of 25000 g and charged into a Henschel mixer, and an aminoalkyl-based silane coupling agent was added thereto in an amount of 0.5 part by weight based on 100 parts by weight of the above-described ferrite particles and mixed with each other for 20 min until a uniform mixture was obtained. In addition, 11.98 parts by weight of a 12-nylon resin having a relative viscosity of 1.60 and 0.2 part by weight of a fatty acid amide were charged into the resulting mixture and further mixed with each other for 30 min, thereby preparing a mixture of a resin composition for bonded magnets.

The resulting mixture of the resin composition for bonded magnets was fed at a constant rate into a twin-screw kneader and kneaded therein at a temperature capable of melting the 12-nylon resin. The obtained kneaded material was taken out from the kneader in the form of strands, and cut into pellets each having a size of 2 mm$\phi$×3 mm, thereby obtaining a resin composition for bonded magnets in the form of pellets.

The production conditions used above and various properties of the thus obtained resin composition for bonded magnets are shown in Table 3.

Example 4

The resin composition for bonded magnets comprising the ferrite particles obtained in Example 2, the 12-nylon resin and the silane coupling agent was produced in the same manner as in Example 3.

Various properties of the thus obtained resin composition for bonded magnets are shown in Table 3.

Example 5

The resin composition for bonded magnets comprising the ferrite particles obtained in Example 1, the 12-nylon resin and the silane coupling agent was produced in the same manner as in Example 3 except for variously changing the amounts of the 12-nylon resin and silane coupling agent as well as a release agent added thereto.

Various properties of the thus obtained resin composition for bonded magnets are shown in Table 3.

Comparative Examples 3 and 4 (for Comparison with Example 3)

The resin compositions for bonded magnets comprising various obtained ferrite particles, the 12-nylon resin and the silane coupling agent were produced in the same manner as in Example 3.

Various properties of the thus obtained resin composition for bonded magnets are shown in Table 3.

Comparative Examples 5 and 6 (for Comparison with Example 5)

The resin compositions for bonded magnets comprising various obtained ferrite particles, the 12-nylon resin and the silane coupling agent were produced in the same manner as in Example 5.

Various properties of the thus obtained resin composition for bonded magnets are shown in Table 3.

Example 6

<Molding of Test Piece Molded Product>

The resin composition for bonded magnets obtained in Example 3 was dried at 100° C. for 3 hr, melted at 280° C. in an injection molding machine, and injection-molded into a metal mold set at 80° C. for an injecting time of 0.3 sec, thereby preparing a test piece molded product having an overall length of 175 mm, an overall width of 12.5 mm and a thickness of 3.2 mm. The injection moldability and various properties of the thus prepared test piece molded product are shown in Table 4.

Example 7

The same procedure as in Example 6 was conducted except that the resin composition for bonded magnets obtained in Example 4 was used, thereby preparing a test piece molded product. The injection moldability and various properties of the thus prepared test piece molded product are shown in Table 4.

Example 8

The same procedure as in Example 6 was conducted except that the resin composition for bonded magnets obtained in Example 5 was used, thereby preparing a test piece molded product. The injection moldability and various properties of the thus prepared test piece molded product are shown in Table 4.

Comparative Examples 7 and 8

The same procedure as in Example 6 was conducted except that various resin compositions for bonded magnets were used, thereby preparing test piece molded products. The injection moldability and various properties of the thus prepared test piece molded products are shown in Table 4.

Comparative Examples 9 and 10

The same procedure as in Example 8 was conducted except that various resin compositions for bonded magnets were used, thereby preparing a test piece molded product. The injection moldability and various properties of the thus prepared test piece molded products are shown in Table 4.

TABLE 1

| Examples and Comparative Examples | Production of ferrite particles | | | |
|---|---|---|---|---|
| | Fe raw material | | Sr raw material | |
| | Kind | Amount (g) | Kind | Amount (g) |
| Example 1 | $\alpha\text{-}Fe_2O_3$ | 100,000 | $SrCO_3$ | 15,900 |
| Example 2 | $\alpha\text{-}Fe_2O_3$ | 100,000 | $SrCO_3$ | 15,900 |
| Comparative Example 1 | $\alpha\text{-}Fe_2O_3$ | 100,000 | $SrCO_3$ | 15,900 |
| Comparative Example 2 | $\alpha\text{-}Fe_2O_3$ | 100,000 | $SrCO_3$ | 16,020 |

| Examples and Comparative Examples | Production of ferrite particles | | | | |
|---|---|---|---|---|---|
| | 2Fe/Sr Molar ratio (—) | $SrCl_2$ | | $Na_2B_4O_7$ | |
| | | Amount (g) | Addition ratio (wt %) | Amount added (g) | Addition ratio (wt %) |
| Example 1 | 5.95 | 2898 | 2.5 | 290 | 0.25 |
| Example 2 | 5.95 | 2318 | 2.0 | 232 | 0.20 |
| Comparative Example 1 | 5.95 | 3477 | 3.0 | 348 | 0.30 |
| Comparative Example 2 | 5.90 | 4061 | 3.5 | 580 | 0.50 |

| Examples and Comparative Examples | Production of ferrite particles | | | |
|---|---|---|---|---|
| | Granulation Pressure (kg/cm²) | Calcination temperature (° C.) | Pulverization Pulverizing device | Heat treatment Treatment temperature (° C.) |
| Example 1 | 90 | 1150 | Dry vibration mill | 970 |
| Example 2 | 90 | 1160 | Dry vibration mill | 980 |
| Comparative Example 1 | 70 | 1170 | Dry attritor | 970 |
| Comparative Example 2 | 50 | 1180 | Dry attritor | 970 |

TABLE 2

| Examples and Comparative Examples | XRD properties | | | |
|---|---|---|---|---|
| | Crystallite size | | Distortion | |
| | Oriented state (nm) | Non-oriented state (nm) | Oriented state (—) | Non-oriented state (—) |
| Example 1 | 910 | 215 | 0.0871 | 0.1018 |
| Example 2 | 1110 | 186.8 | 0.0669 | 0.0675 |
| Comparative Example 1 | 322 | 171 | 0.1993 | 0.1600 |
| Comparative Example 2 | 310 | 186 | 0.2158 | 0.1787 |

TABLE 2-continued

| Examples and Comparative Examples | Properties of particles | | |
|---|---|---|---|
| | Average particle diameter Ps-f (μm) | Compacted density CD (g/cm$^3$) | Specific surface area BET (m$^2$/g) |
| Example 1 | 1.57 | 3.21 | 1.87 |
| Example 2 | 1.72 | 3.24 | 1.60 |
| Comparative Example 1 | 1.65 | 3.25 | 1.65 |
| Comparative Example 2 | 1.62 | 3.33 | 1.70 |

| Examples and Comparative Examples | Properties of particles | | |
|---|---|---|---|
| | Particle shape Plate diameter/thickness (—) | Compact magnetic properties | |
| | | iHc (Oe) | Br (G) |
| Example 1 | 2-4 | 2950 | 1810 |
| Example 2 | 2-4 | 3070 | 1790 |
| Comparative Example 1 | 2-3 | 2950 | 1750 |
| Comparative Example 2 | 1-3 | 2790 | 1790 |

| Examples and Comparative Examples | EVA kneading magnetic properties Magnetic field orientation (9 kOe) | | |
|---|---|---|---|
| | Br (G) | 4·Is (G) | Br/4·Is (—) |
| Example 1 | 2810 | 2890 | 0.972 |
| Example 2 | 2800 | 2880 | 0.972 |
| Comparative Example 1 | 2800 | 2880 | 0.972 |
| Comparative Example 2 | 2800 | 2860 | 0.979 |

TABLE 3

| Examples and Comparative Examples | Properties of resin composition for bonded magnets | | |
|---|---|---|---|
| | Kind of ferrite | MFR (g/10 min) | Molding density (g/cm$^3$) |
| Example 3 | Example 1 | 68 | 3.53 |
| Example 4 | Example 2 | 66 | 3.52 |
| Example 5 | Example 1 | 62 | 3.68 |
| Comparative Example 3 | Comparative Example 1 | 65 | 3.52 |
| Comparative Example 4 | Comparative Example 2 | 70 | 3.52 |
| Comparative Example 5 | Comparative Example 1 | 50 | 3.68 |
| Comparative Example 6 | Comparative Example 2 | 76 | 3.71 |

| Examples and Comparative Examples | Properties of resin composition for bonded magnets Evaluation of magnetic properties upon injection-molding | | | |
|---|---|---|---|---|
| | Hk | | bHc | |
| | (kA/m) | (Oe) | (kA/m) | (Oe) |
| Example 3 | 210.9 | 2650 | 204.5 | 2570 |
| Example 4 | 217.6 | 2735 | 207.7 | 2610 |
| Example 5 | 205.3 | 2580 | 206.9 | 2600 |
| Comparative Example 3 | 195.0 | 2450 | 192.6 | 2420 |
| Comparative Example 4 | 182.2 | 2290 | 188.6 | 2370 |
| Comparative Example 5 | 192.6 | 2420 | 198.1 | 2490 |
| Comparative Example 6 | 187.8 | 2360 | 191.8 | 2410 |

| Examples and Comparative Examples | Properties of resin composition for bonded magnets Evaluation of magnetic properties upon injection-molding | | | |
|---|---|---|---|---|
| | iHc | | (BH)$_{max}$ | |
| | (kA/m) | (Oe) | (kJ/m$^3$) | (MGOe) |
| Example 3 | 260.2 | 3270 | 15.44 | 1.94 |
| Example 4 | 270.6 | 3400 | 15.44 | 1.94 |
| Example 5 | 244.3 | 3070 | 16.71 | 2.10 |
| Comparative Example 3 | 238.7 | 3000 | 14.72 | 1.85 |
| Comparative Example 4 | 240.3 | 3020 | 14.33 | 1.80 |
| Comparative Example 5 | 234.8 | 2950 | 16.39 | 2.06 |
| Comparative Example 6 | 231.6 | 2910 | 15.12 | 1.90 |

| Examples and Comparative Examples | Properties of resin composition for bonded magnets Evaluation of magnetic properties upon injection-molding | | | | |
|---|---|---|---|---|---|
| | Br | | 4·Is | | Br/4·Is |
| | (mT) | (G) | (mT) | (G) | (—) |
| Example 3 | 281 | 2810 | 290 | 2900 | 0.969 |
| Example 4 | 280 | 2800 | 289 | 2890 | 0.969 |
| Example 5 | 292 | 2920 | 304 | 3040 | 0.961 |
| Comparative Example 3 | 274 | 2740 | 287 | 2870 | 0.955 |
| Comparative Example 4 | 271 | 2710 | 284 | 2840 | 0.954 |
| Comparative Example 5 | 287 | 2870 | 303 | 3030 | 0.947 |
| Comparative Example 6 | 278 | 2780 | 297 | 2970 | 0.936 |

TABLE 4

| Examples and Comparative Examples | Resin composition for bonded magnets | Properties of dumbbell test piece molded product | | |
|---|---|---|---|---|
| | | Flexural strength (MPa) | Tensile strength (MPa) | Izod impact strength (kJ/m$^2$) |
| Example 6 | Example 3 | 127.0 | 64.0 | NB |
| Example 7 | Example 4 | 125.0 | 64.0 | 23.94 |
| Example 8 | Example 5 | 118.0 | 61.5 | 17.0 |
| Comparative Example 7 | Comparative Example 3 | 126.0 | 61.5 | NB |
| Comparative Example 8 | Comparative Example 4 | 130.0 | 63.0 | NB |
| Comparative Example 9 | Comparative Example 5 | 116.0 | 62.0 | 16.8 |
| Comparative Example 10 | Comparative Example 6 | 120.0 | 60.6 | 19.6 |

Note
NB: Not Break

As shown in Table 3, the molded product obtained by injection-molding the resin composition for bonded magnets according to the present invention had a residual magnetic flux density of not less than 230 mT (2300 G), 4·Is of not less than 230 mT (2300 G), Br/4·Is of not less than 0.96, a coercive force iHc of 206.9 to 278.5 kA/m (2600 to 3500 Oe), and a maximum energy product $BH_{max}$ of not less than 10.3 kJ/m³ (1.30 MGOe).

Further, when comparing the molded bodies of the resin compositions having substantially the same molding density with each other, that is, in comparison between Examples 3 and 4 and Comparative Examples 3 and 4 and between Example 5 and Comparative Examples 5 and 6, it was confirmed that the molded bodies obtained in the Examples were excellent in respective magnetic properties, i.e., Hk, bHc, iHc, $BH_{(max)}$, Br, 4·Is and Br/4·Is, as compared to those obtained in the Comparative Examples.

Further, as shown in Table 4, it was confirmed that the molded bodies obtained in Examples 6 and 7 were excellent in magnetic properties and mechanical strength as compared to those obtained in Comparative Examples 7 and 8, and also the molded body obtained in Example 8 was excellent in magnetic properties and mechanical strength as compared to those obtained in Comparative Examples 9 and 10.

Thus, it was confirmed that the injection-molded cores produced according to the present invention were excellent in orientation properties as compared to those obtained in the Comparative Examples.

INDUSTRIAL APPLICABILITY

The bonded magnet obtained by using the ferrite particles and/or the resin composition for bonded magnets according to the present invention exhibits a high orientation property, a high magnetic force, a high coercive force, and a high Hk, and is excellent in both flexural strength and magnetic properties, and therefore the ferrite particles and/or the resin composition according to the present invention can be suitably used as ferrite particles and/or a resin composition for bonded magnets, in particular, as those for motors and rotors.

The invention claimed is:

1. Ferrite particles for bonded magnets, having a crystal distortion of not more than 0.14 as measured by XRD, an average particle diameter of not less than 1.30 μm as measured by Fisher method, and a residual magnetic flux density Br of 160 to 200 mT (1600 to 2000 G).

2. The ferrite particles for bonded magnets according to claim 1, wherein the ferrite particles are magnetoplumbite-type ferrite particles.

3. A resin composition for bonded magnets, comprising 83 to 93% by weight of the ferrite particles for bonded magnets as claimed in claim 1 and comprising 7 to 17% by weight of an organic binder component.

4. A molded product comprising the resin composition for bonded magnets as claimed in claim 3.

5. The molded product according to claim 4, wherein the molded product is an injection-molded product.

* * * * *